(No Model.)
J. SEBASTIAN.
DRAFT EQUALIZER.
No. 252,810. Patented Jan. 24, 1882.
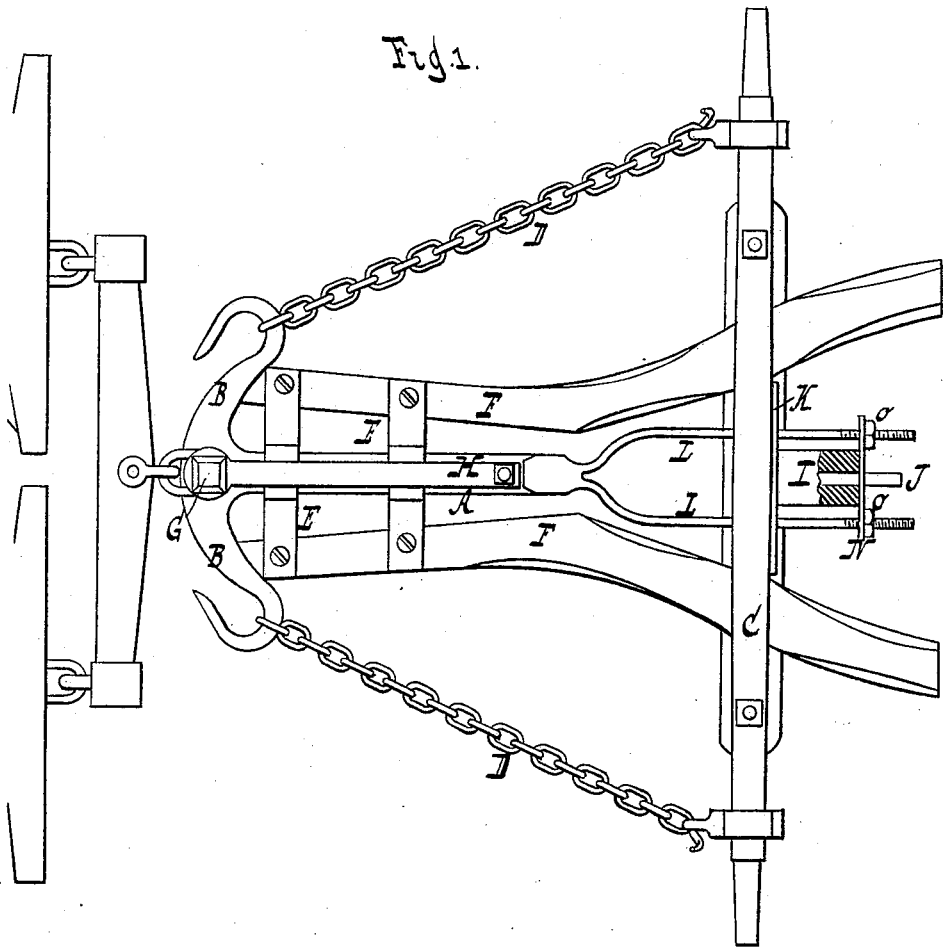
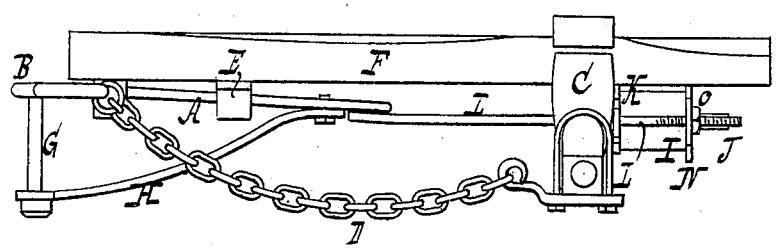
Witnesses
William Miller
Otto Hufeland
Inventor
Jacob Sebastian
by Van Santvoord & Hauff
his Att'ys

UNITED STATES PATENT OFFICE.

JACOB SEBASTIAN, OF NEW YORK, N. Y.

DRAFT-EQUALIZER.

SPECIFICATION forming part of Letters Patent No. 252,810, dated January 24, 1882.

Application filed November 26, 1881. (No model.)

*To all whom it may concern:*

Be it known that I, JACOB SEBASTIAN, a citizen of the United States, residing at New York, in the county and State of New York, have invented new and useful Improvements in Draft-Equalizers, of which the following is a specification.

My present invention consists in the combination, as hereinafter set forth, of the axle with the sliding draft-bar, provided with laterally-projecting arms at its front end and having its rear end passing through the axle, the chains directly connecting said arms of the draft-bar with the axle, and the spring arranged on the axle so as to be acted upon and compressed by the draft-bar, in starting the vehicle. Also, in the combination, substantially as hereinafter described, of the axle with the sliding draft-bar, having its forward end connected to the axle by means of chains and having its rear end bifurcated and arranged to extend through the axle, a tubular india-rubber spring fitted on a core projecting from the axle, and a cross-head upon the bifurcated end of the draft-bar arranged to act against the spring, whereby the draft-bar compresses the spring, in the manner hereinafter specified.

This invention is illustrated in the accompanying drawings, in which Figure 1 represents and inverted plan view. Fig. 2 is a side view.

Similar letters indicate corresponding parts.

The letter A designates the sliding draft-bar, B its laterally-projecting arms, C the forward axle, and D the chains connecting the arms of the draft-bar to the axle, the arms having hooked ends for the reception of the chains.

The draft-bar A is guided in slotted cross-pieces E, which are fastened to hounds F, and at the forward end of the bar is the whiffletree-bolt G, steadied by the keeper H. The rear end of the draft-bar A extends through the axle C and acts on a spring, I, whenever it is pulled forward, as in starting the vehicle, to compress the spring, so that the draft-bar is permitted to yield, making the whole what is known as an "easy starter," while it is automatically retracted and brought to a normal position on the cessation of the strain put on it by the draft animals.

The chains D are left slack, as shown in Fig. 2, and the degree of their slackness determines the extent to which the spring may yield, inasmuch as when the chains become taut the action of the draft-bar on the spring ceases, being transferred to the axle by the chains.

The spring I is made of india-rubber, in shape like a tube, and is fitted on a core, J, projecting rearwardly from the axle C, the core being a fixture of a plate, K, and one end of the tube composing the spring impinging against the plate.

The rear end of the draft-bar A, where it extends through the axle C, is bifurcated, and the branches L thereof carry a cross-head, N, which impinges against the outer or rear end of the tubular spring I, the cross-head sliding on the core J and being held in place by screw-nuts, o, fitted on the bars. The tubular spring I is thus interposed between the cross-head N and the axle, and such head constitutes the part of the draft-bar acting on the spring.

This construction and arrangement of the spring and its concomitants is a cheap and durable one; but I do not wish to be restricted thereto, as the spring can also be made of metal and applied either in rear or in front of the axle.

What I claim as new, and desire to secure by Letters Patent, is—

1. In a draft-equalizer for vehicles, the combination, with the front axle having a spring supported at its rear side, of a horizontally-sliding draft-bar connected at its forward portion with the front axle and having its rear end extended directly through the said front axle and acting on the rear end portion of the spring, substantially as described, whereby the forward thrusts of the draft-bar are relieved by the spring and sustained by the front axle, as set forth.

2. In a draft-equalizer, the horizontally-sliding draft-bar having its rear end extended directly through the front axle of the vehicle, and provided at its forward end with lateral arms connected with the axle, in combination with a spring arranged directly in rear of the front axle and supported thereby and acting on the rearward extension of the draft-bar, substantially as and for the purpose described.

3. The combination, substantially as hereinbefore set forth, of the axle, the sliding draft-bar having its forward end connected to the axle by means of chains, and having its rear end bifurcated and arranged to extend through the axle, the tubular india-rubber spring fitted on a core projecting from the axle, and the cross-head whereby the draft-bar acts on the spring in the manner specified.

In testimony whereof I have hereunto set my hand and seal in the presence of two subscribing witnesses.

JACOB SEBASTIAN. [L. S.]

Witnesses:
W. HAUFF,
CHAS. WAHLERS.